United States Patent [19]

Barrett et al.

[11] 4,081,774

[45] Mar. 28, 1978

[54] ACTUATING DEVICE

[75] Inventors: William J. Barrett; Hal G. Meyer, both of Rockford, Ill.

[73] Assignee: Barber-Colman Company, Rockford, Ill.

[21] Appl. No.: 676,124

[22] Filed: Apr. 12, 1976

[51] Int. Cl.² ............................................. H01F 7/18
[52] U.S. Cl. ................................... 335/228; 335/259
[58] Field of Search ................... 310/23, 24, 30; 335/228, 189, 190, 267, 268, 259, 264; 74/126

[56] References Cited

U.S. PATENT DOCUMENTS

| | | | |
|---|---|---|---|
| 2,842,334 | 7/1958 | Short | 335/267 |
| 2,901,210 | 8/1959 | Hebard | 335/267 |
| 2,989,871 | 6/1961 | Straub et al. | 310/23 |
| 3,435,391 | 3/1969 | Straub | 310/23 |
| 3,501,968 | 3/1970 | Fredell | 74/126 |

FOREIGN PATENT DOCUMENTS 1,057,068  2/1967  United Kingdom ............... 335/228

Primary Examiner—Harold Broome
Attorney, Agent, or Firm—McDougall, Hersh & Scott

[57] ABSTRACT

An actuating device is disclosed which is modular in construction. The device employs a modular head having a rotatable output shaft for controlling valves, etc. One or more force motors are arranged to actuate the output shaft according to the required application. The force motors are electromagnetic and can accurately position the output shaft as a function of applied current.

12 Claims, 7 Drawing Figures

ACTUATING DEVICE

BACKGROUND OF THE INVENTION

The invention relates generally to positioning devices. More specifically, it relates to an electromagnetic positioning device capable of providing a relatively precise mechanical output. Electromagnetic devices have been used for some time to function as linear or rotatable force motors in order to drive or position output shafts. For example, U.S. Pat. No. 3,883,839, assigned to the present assignee, disclosed an electromagnetic positioning device of a type similar to the present invention.

It is frequently desirable to move valves or other types of switches in a system through which fluid is flowing and to move valves to precise positions in order to accurately control the quantity of fluid flow flowing in the system as, for example, a throttle on a fuel delivery system for an engine. Frequently the valve is moved to a desired position by a rotatable element, such as a shaft, which may be actuated by hand or by a force motor either of the linear or rotary type.

Prior force motors have not always been sufficiently accurate nor have they been available to handle a wide variety of applications. Often it is necessary to construct a force motor designed for a given application in order that the precision for a desired application can be achieved.

Accordingly, it is an object of the present invention to provide a novel electromagnetic actuating device capable of moving a control element, such as a valve, to a precise position.

A further object of the invention is to provide such a device which is capable of achieving precise positioning over a wide range of force and displacement applications by cascading two or more force motors in series, as necessary.

Another object of the present invention is to provide a modular actuating device which is easily serviced and which can be assembled with as many force motor units as necessary for a given application.

A further object of the invention is to provide an actuator device which is low in cost and is of increased versatility.

Other objects and advantages of the invention will become apparent from the remaining portions of the specification.

BRIEF SUMMARY OF THE INVENTION

The objects of the invention are achieved by employing a modular actuating device. A modular head according to either of two embodiments of the invention has an output shaft rotatable thereon. One or more force motor units are used for rotating the output shaft a selected amount, the number of force motors utilized being a function of the required output torque.

DETAILED DESCRIPTION

Figure 1:
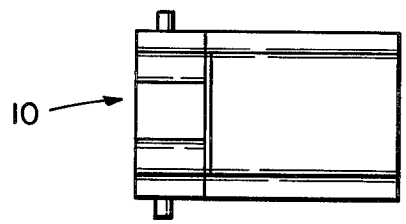
FIG. 1 is a plan view of the invention according to a first embodiment.
Figure 2:
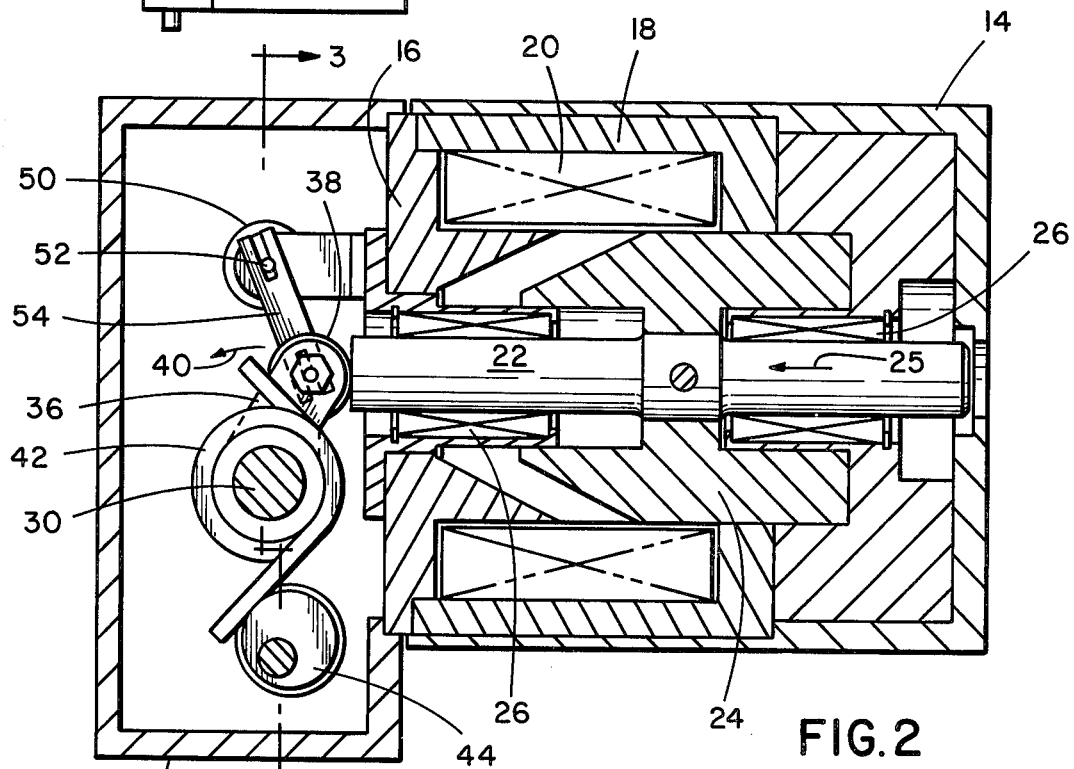
FIG. 2 is a sectional view through the invention illustrating the details thereof.

Referring to FIGS. 1 through 4, the invention according to the first embodiment is disclosed. The invention employs a modular design including a modular head 10 and a force motor 12. The force motor is an electromagnetically controlled linear actuator. A housing or casting 14 surrounds a stator base 16 of magnetic material. In the illustrated embodiment the stator base 16 is frusto-conical in shape having a cup-like opening. Disposed adjacent the base is a coil housing 18 and actuator coils 20. Located centrally of the housing is the center shaft 22 and the attached magnetic slug 24. As indicated in FIG. 2, the slug 24 is frusto-conical in shape and tapers reciprocally to the taper of the stator base.

As indicated by the arrow 25 in FIG. 2, the shaft 22 and the attached slug 24 move linearly to the left upon application of electric current through the coils 20. That is, the center shaft 22 moves toward the base 16 when an electromagnetic field is created by the coils 20. This linear movement is coupled by a linkage in the modular head to produce rotational movement for a purpose to be described. Return movement of the center shaft to its unactuated position is accomplished by torsion or coil springs provided in the modular head in the absence of an electro magnetic field.

The center shaft is mounted for its linear movement on a set of ball bushings 26 which bushings have an extremely low coefficient of friction. The ball bushings, due to their construction, impart a rotational force on the center shaft. Since the shaft is rotationally unrestrained, this causes a slight rotation of the center shaft during repeated movements to the left and right. This is a highly desirable feature in that it reduces bearing wear and prevents scoring of the center shaft providing long life and precise operation.

Figure 4:
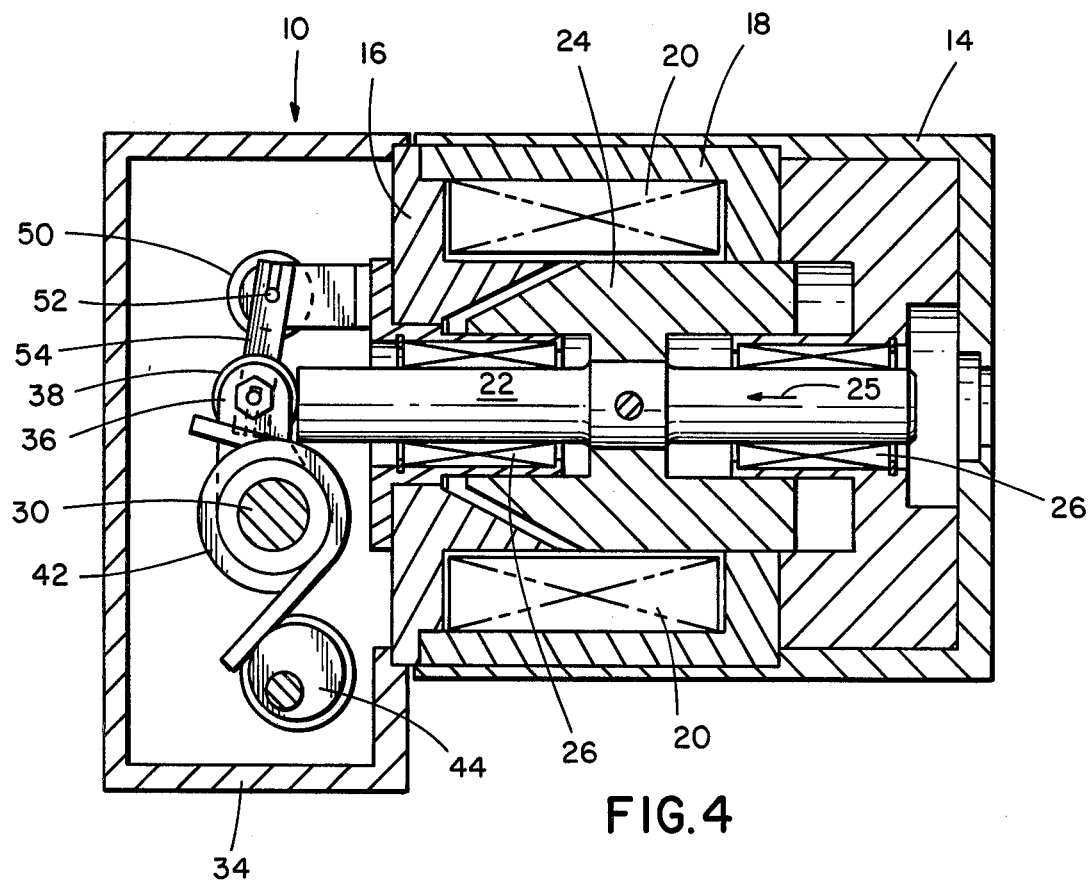
FIG. 4 is a view similar to FIG. 2 in which the force motor has rotated the output shaft.

Referring to FIG. 4, the force motor is shown in the actuated condition in which the center shaft 22 extends a substantial distance into the modular head 10 for engaging the linkage now to be described. Upon de-energization of the coil 20, the spring bias provided in the modular head returns the center shaft to the unactuated position illustrated in FIG. 2.

Figure 3:
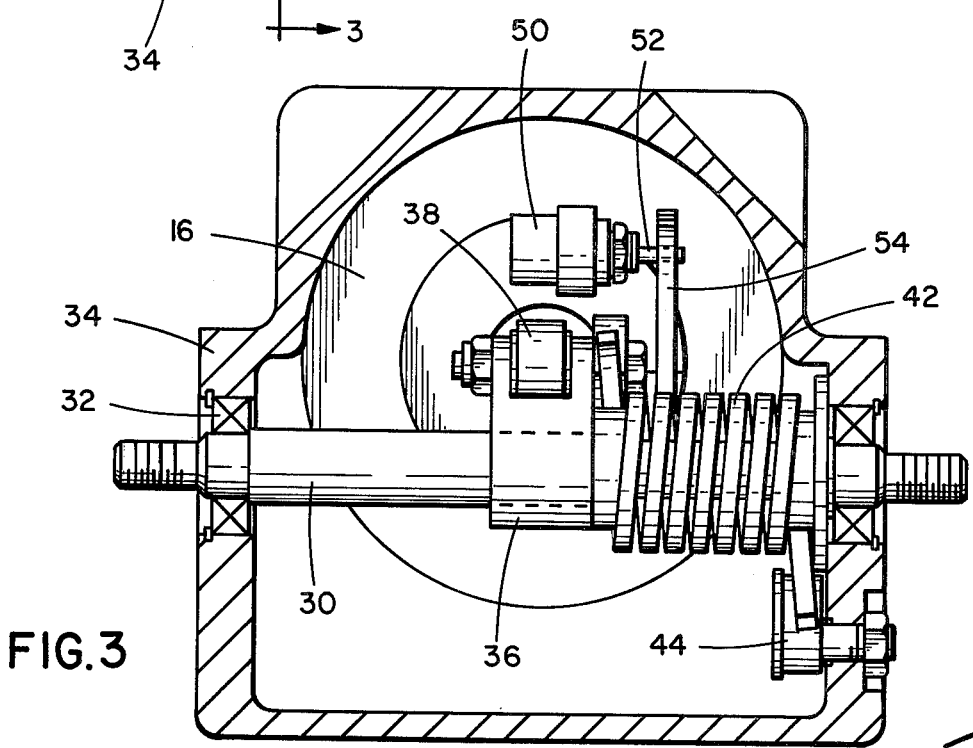
FIG. 3 is a sectional view along the lines 3—3 of FIG. 2.

Referring to FIGS. 2 and 3, the modular head according to a first embodiment comprises a rotating output shaft 30 journaled in bearings 32 provided in a housing 34. The output shaft is adapted for connection to various control devices, such as the fluid control valves described in the background section of the specification. The degree of rotation of the output shaft controls the rate of flow of fluid pass such a valve. Secured to the shaft 30 approximately midway between the bearings is a linkage assembly including a yoke 36 and roller link 38. As indicated in FIG. 2, the roller 38 is positioned so that when the modular head 10 is joined to the force motor 12 the end of the center shaft 22 engages the roller. Movement of the center shaft to the left responsive to current flow through the coils 20 is effective for pivoting the roller linkage as indicated by the arrow 40. Since the shaft is attached to the yoke it rotates therewith.

According to a first embodiment a torsion spring 42 is provided in the modular head to bias the linkage and shaft to the position indicated in FIG. 2. The torsion spring 42 is pre-tensioned by an adjustable cam 44 which is then secured in place. The torsion spring 42 urges the yoke and roller 38 against the center shaft 22 and, in fact, is pre-tensioned an amount sufficient to restore the center shaft 22 to its initial position in the absence of an electric current through the coils 20. When the coils are energized, however, the bias of torsion spring 42 is overcome causing rotational movement of the output shaft 30.

A complete and operative actuating device of the type thus far described is usually provided with a closed loop or feedback control system. Such a system requires the provision of a signal representative of the actual position of the output shaft so that the current through the coils 20 can be altered as necessary. One method of producing this signal is to provide an electrical potentiometer, such as potentiometer 50, in the modular head 10. This potentiometer has a rotatable shaft 52 connected by pivot link 54 to roller 38. Thus, as the roller 38 moves within the modular head, the resistance value produced by the potentiometer 50 changes providing an electrical feedback signal for use by a control circuit associated with the device. As will be known by those skilled in the art, a feedback or control signal can be derived by changing other physical parameters in the system if desired.

As indicated in the background section of the application, by use of feedback and the construction disclosed herein highly accurate control of the degree of rotation of the output shaft can be obtained. As also indicated, depending upon the application, the force which must be generated by the center shaft 22 will vary depending upon the application to which the actuator is put. In some applications the force generated by a single set of coils 20 is insufficient. Heretofore, it was the practice to provide a larger special order actuator where the force required was in excess of a standard unit output.

Figure 5:
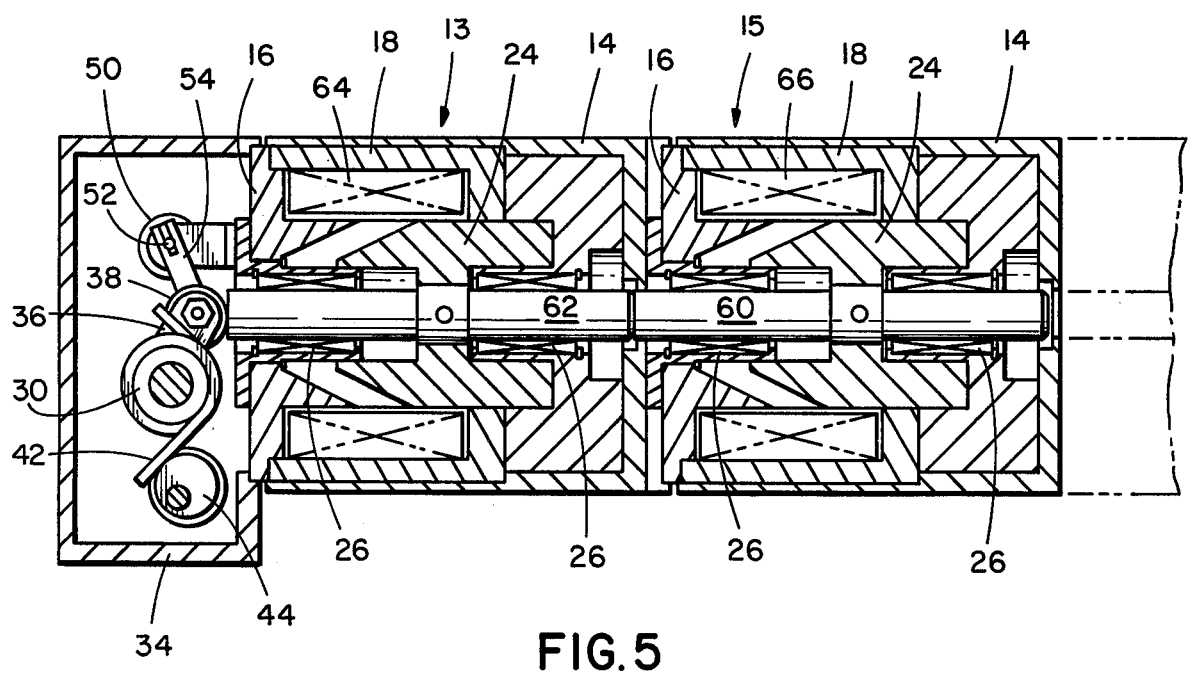
FIG. 5 is a view similar to FIG. 2 illustrating the use of two or more force motors in series to increase the force applied to the output shaft.

According to the present invention, however, and as illustrated in FIG. 5, it is possible by use of a modular design to place a number of force motors in series with a single modular head. Thus, a substantial savings is obtained over two complete units since only a single output shaft is involved and no mechanical linkage is required to connect the separate units. In the embodiment according to FIG. 5 two force motors 13 and 15, identical in construction, are provided. The casting 14 is modified so that the center shaft 60 of the rear force motor can enter the housing of the force motor 13. The two center shafts 60 and 62 are in contact, each center shaft being actuated by its respective coils 64 and 66. Actuation of both coils simultaneously is effective for substantially increasing the force applied by the center shaft 62 on the roller linkage 38 and ultimately the output shaft 30.

As indicated by the dashed outlines in FIG. 5, it will be apparent that the concept of placing force motors in series to increase the actuation force is not limited to two motors. Three, four or more force motors may be cascaded to obtain a desired force output for application to the roller linkage 38. When more than one force motro is utilized, the torsion spring 42 must be pre-tensioned to a value sufficient to restore the center shafts to their initial positions when the coils are de-energized.

As is clear from the preceding description, when the coils of the force motor are energized a magnetic circuit is created constituted by the stator base 16, the coil housing 18 and the slug 24 which is attached to the center shaft. This draws the slug and center shaft towards the base against the force of the torsion spring 42. The construction and dimensions of the base and slug in conjunction with the low friction ball bushings permit positioning of the center shaft precisely as a function of the degree of energization of the coils 20. By use of a feedback control circuit known in the art and associated with potentiometer 50, accurate positioning down to 0.01 inches or better is obtainable.

Figure 6:
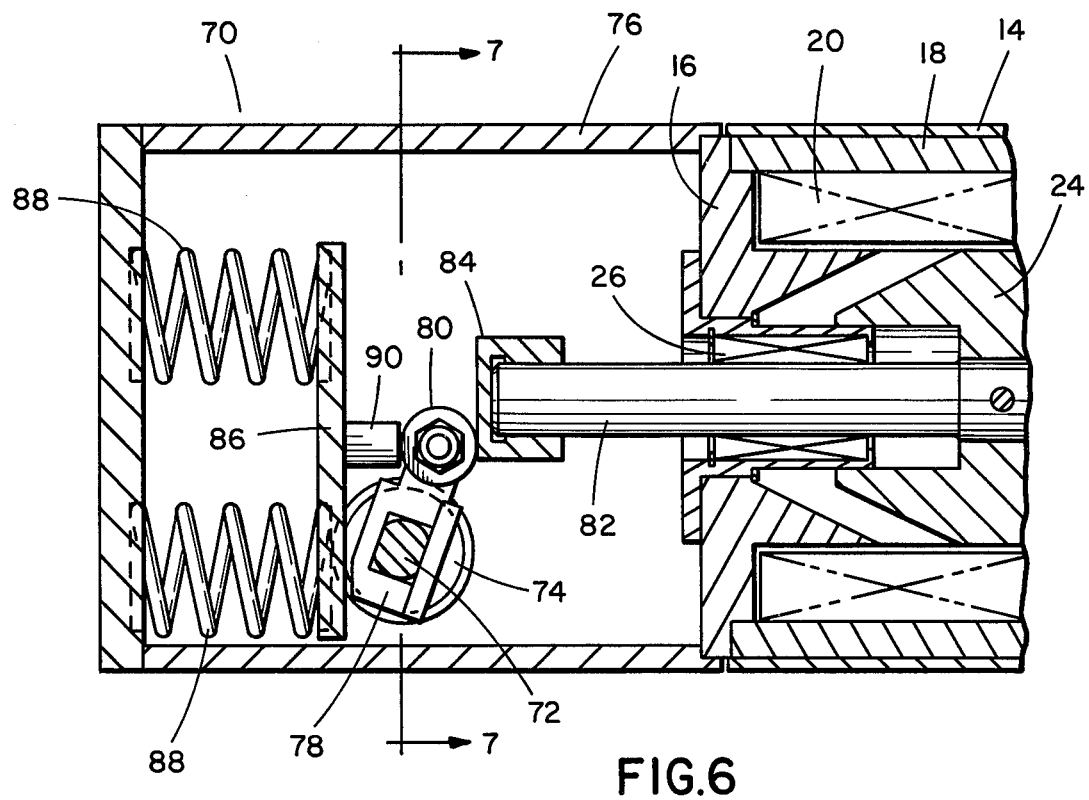
FIG. 6 is a sectional view illustrating a modular head according to a second embodiment of the invention.
Figure 7:
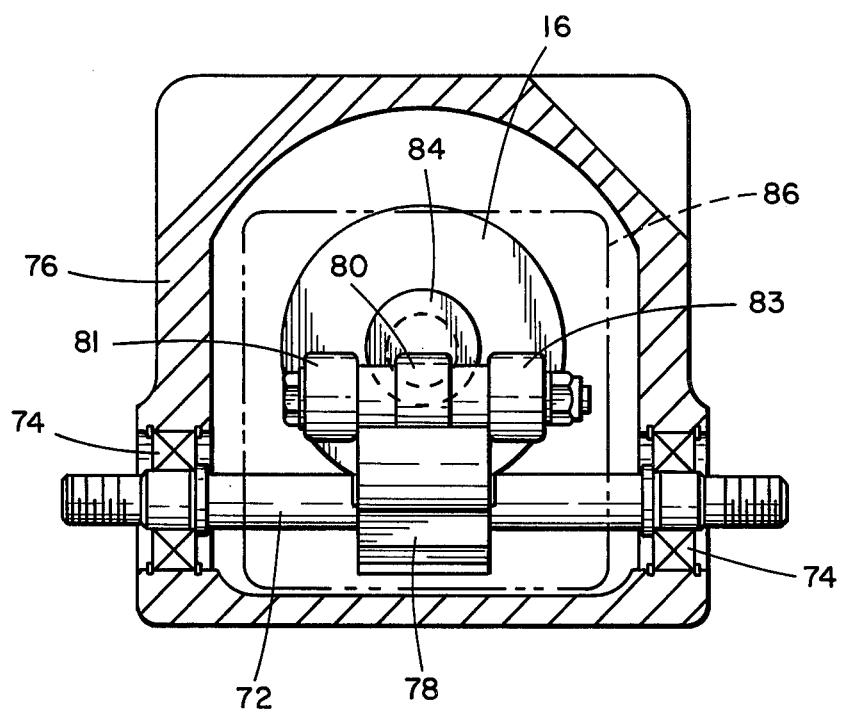
FIG. 7 is a sectional view along the lines 7—7 of FIG. 6.

Referring now to FIGS. 6 and 7, a second embodiment of the modular head is illustrated. In this embodiment a modular head 70 is provided with an output shaft 72 journaled in bearings 74 of the housing 76. The shaft is rotated by means of a yoke 78 and central roller member 80 when struck by the center shaft 82 which may have an end cap 84 thereon if desired. In this embodiment, in place of the torsion spring, a platform and coil spring arrangement is utilized. A platform 86 is resiliently supported by a plurality of coil springs 88, preferably one spring at each corner of the platform. Extending perpendicularly from the platform 86 are two engagement blocks 90 which rest against outer roller members 81 and 83 on the side opposite the center shaft 82. As will be apparent, when the center shaft 82 moves to the left, the output shaft 72 is rotated by movement of the roller linkage 80 which overcomes the bias of the coil springs 88. When the coils are de-energized, the spring loaded platform 86 reverses the movement of the output shaft and restores the center shaft to its initial position. In all other respects, the second embodiment is identical with the first embodiment and, in particular, it may be utilized with one or more force motors, as necessary for a particular application. Where a number of force motors are placed in series the coil springs 88 may have to be stronger to provide sufficient restorative force.

While we have shown and described embodiments of this invention in some detail, it will be understood that this description and illustrations are offered merely by way of example, and that the invention is to be limited in scope only by the appended claims.

We claim:

1. At least two electromagnetic force motors for actuating an external control device which is normally biased to a first position, each of said motors comprising:

a housing open at both ends thereof, said control device being positioned at one of said open ends of a first motor, a center rod in said housing supported on bearings for linear movement toward and away from engagement with said control device, electromagnetic circuit means operable for selectively positioning said rod at any desired point between actuated and unactuated positions, said rod being maintained at said unactuated position by the bias of said control device in the absence of operation of said circuit means, the other open end of said housing receiving additional force motors, the center rods of each motor positioned in axial alignment and physical contact, thereby to increase the force applied to said control device when said force motors are actuated simultaneously.

2. The device according to claim 1 wherein said center rod is supported on ball bushings which slightly rotate the rod during each actuation thereof to prevent excessive wear on the rod surface.

3. The device according to claim 1 wherein said circuit means includes:
   a. a hollow frusto-conical stator base,
   b. a frusto-conical magnetic slug attached to and movable with said center rod,
   c. electromagnetic coils wound concentrically of said rod,
said base magnetically attracting said slug and the attached rod when electric current is passed through said coils thereby causing said rod to engage said control device.

4. In combination an external control device and an electromagnetic force motor for actuating said control device which is normally biased to an unactuated position comprising:
   a housing open at both ends thereof, said control device being positioned at one of said open ends,
   a center rod in said housing supported on bearings for linear movement toward and away from engagement with said control device,
   electromagnetic circuit means operable for selectively positioning said rod, said rod being maintained at an initial position by the bias of said control device in the absence of operation of said circuit means,
   the other open end of said housing permitting the cascading of one or more additional force motors in series with the center rods of each motor in axial alignment and physical contact to thereby increase the force applied to said control device when said force motors are actuated simultaneously,
   said external control device including a modular head positioned over said one of end of said housing and including:
   a rotatable output shaft mounted therein,
   b. means for biasing said shaft to a first position,
   c. means for rotating said shaft from said first position,
   said rod engaging said rotating means to rotated said shaft an amount proportional to the applied electromagnetic force against the bias of said biasing means.

5. The device according to claim 4 further including means for detecting the position of said shaft.

6. The device according to claim 4 wherein said shaft is journaled in bearings and extends from the modular head at both ends thereof permitting right or left side take off.

7. The device according to claim 4 wherein said biasing means includes a pre-tensioned torsion spring urging said shaft to said first position.

8. The device according to claim 7 wherein said biasing means includes means for adjustably pre-tensioning said torsion spring.

9. The device according to claim 7 wherein said spring is concentric with said shaft over a portion thereof.

10. The device according to claim 4 wherein said biasing means includes a plurality of coil springs urging said shaft to said first position.

11. The device according to claim 10 wherein said biasing means further includes a platform resiliently biased by said springs against said rotating means to urge said shaft to said first position.

12. The device according to claim 4 wherein said rotating means includes:
   a. a yoke secured at one end to said shaft,
   b. a roller member attached to the other end of said yoke and positioned in the path of said center rod, whereby movement of said rod moves said roller member and yoke to rotate said shaft.

* * * * *